US011436659B2

(12) United States Patent
Vallelunga et al.

(10) Patent No.: US 11,436,659 B2
(45) Date of Patent: Sep. 6, 2022

(54) BACK END SERVER MODIFICATION AND MODEL VISUALIZATION

(71) Applicant: Reflektion, Inc., San Mateo, CA (US)

(72) Inventors: Jeronimo Vallelunga, Tandil (AR); Rui H. Ewald, San Francisco, CA (US); Vivek Gupta, San Jose, CA (US); Xiaonan Wang, San Francisco, CA (US)

(73) Assignee: REFLEKTION, INC., San Mateo, CA (US)

(*) Notice: Subject to any disclaimer, the term of this patent is extended or adjusted under 35 U.S.C. 154(b) by 106 days.

(21) Appl. No.: 17/099,403

(22) Filed: Nov. 16, 2020

(65) Prior Publication Data

US 2021/0073893 A1 Mar. 11, 2021

Related U.S. Application Data

(63) Continuation of application No. 15/953,058, filed on Apr. 13, 2018, now Pat. No. 11,263,681, and a continuation of application No. 15/953,038, filed on Apr. 13, 2018, now abandoned.

(51) Int. Cl.
| | |
|---|---|
| *G06Q 30/00* | (2012.01) |
| *G06Q 30/06* | (2012.01) |
| *G06Q 10/06* | (2012.01) |
| *G06F 16/9535* | (2019.01) |
| *G06N 3/08* | (2006.01) |
| *G06Q 50/00* | (2012.01) |

(52) U.S. Cl.
CPC ..... *G06Q 30/0631* (2013.01); *G06F 16/9535* (2019.01); *G06Q 10/067* (2013.01); *G06Q 30/0635* (2013.01); *G06N 3/08* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 2014/0207793 A1* | 7/2014 | Liu | G06Q 50/01 707/748 |
| 2015/0142607 A1* | 5/2015 | Yang | G06Q 30/0631 705/26.62 |
| 2018/0260693 A1* | 9/2018 | Dahlmeier | G06N 20/00 |

* cited by examiner

*Primary Examiner* — Mila Airapetian
(74) *Attorney, Agent, or Firm* — Gates & Cooper LLP (57) ABSTRACT

Product recommendations are selected according to a model. Product recommendations may be annotated with rules of the model used to select the products. A user may modify the model and be provided with a URL and a cookie associated with the modified model. Subsequent requests or the URL and presenting the cookie are processed using the modified model. A context may be associated with the cookie and modified by the user to observe performance of the model for the context. An interface may permit a user to specify rules for the model or otherwise model its behavior. User interactions with a website result in recommendations according to the model. A journey is recorded that records content, recommendations, and parameters of the model corresponding to the recommendations. The journeys of users may be filtered and visually presented to a user.

14 Claims, 8 Drawing Sheets

BACK END SERVER MODIFICATION AND MODEL VISUALIZATION

CROSS-REFERENCE TO RELATED PATENT APPLICATION

The present disclosure is a continuation of U.S. patent application Ser. No. 15/953,058, filed Apr. 13, 2018 and U.S. patent application Ser. No. 15/953,038, filed Apr. 13, 2018, both of which are incorporated herein by reference in their entirety.

BACKGROUND

In many ecommerce and other web-based solutions, a front end server operates a web server and provides web pages to user devices in response to requests referencing a URL (Uniform Resource Locator). This front end server may submit database queries or other requests to a back end server that implements accesses a database or implements other specific and complex processing functions. The back end server then provides a response to the front end server which may then add the response to a web page that is returned to the user device.

It would be an improvement in the art to facilitate the development and modeling of this type of software architecture.

BRIEF DESCRIPTION OF THE FIGURES

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
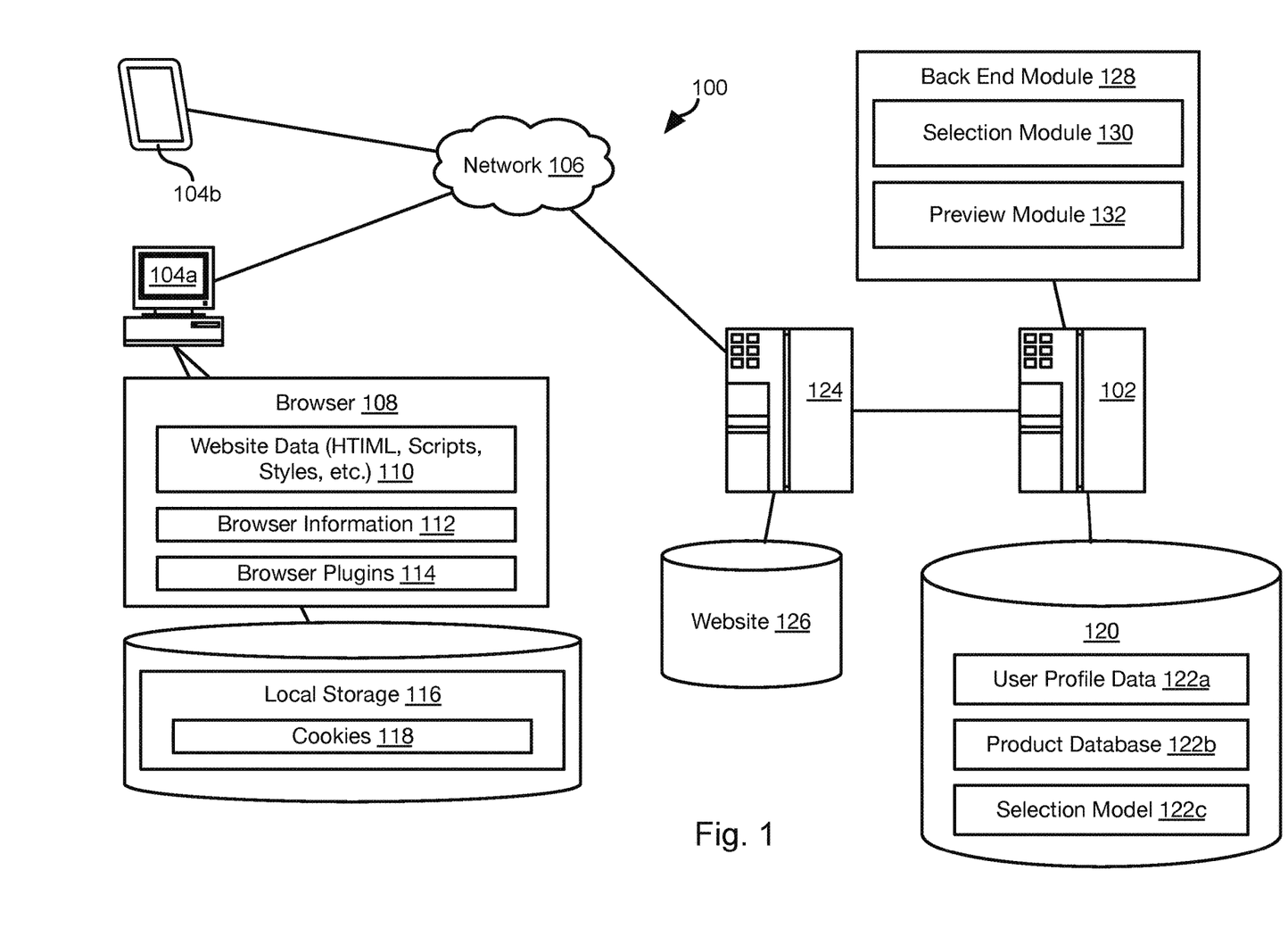
FIG. 1 is a schematic block diagram of a network environment for performing methods in accordance with an embodiment of the present invention.

The methods disclosed herein may be implemented in a network environment 100 including some or all of the illustrated components. In particular, a back end server system 102 may execute the methods disclosed herein with respect to browsing activity of one or more user computers 104a, 104b. The computers 104a, 104b may include desktop or laptop computers, tablet computers, smart phones, wearable computers, internet enabled appliances, or any other type of computing device.

The browsing activities of the computers 104a, 104b may include webpage requests submitted by the computers 104a, 104b to a web server executing on the server system 102 or be reported to the server system 102 by a third party server or by a software component executing on the computers 104a, 104b.

The computers 104a, 104b maybe coupled to the server system 102 by means of a network 106 including a local area network (LAN), wide area network (WAN), the Internet, or any other number of wired or wireless network connections. The network 106 may be understood to possibly include one or more intermediate servers by way of which browsing activities of the computers 104a, 104b are transmitted to the server system 102.

The computers 104a, 104b may execute a browser 108 programmed to retrieve and process data 110, such as by rendering web pages, execute scripts within web pages, formatting website data according to style sheets (e.g., .css files). The browser 108 may execute scripts or process web forms that cause the browser 108 to transmit data submitted through web pages to a source of a web page or some other server system, such as the server system 102.

Communications from the browser 108 may include one or more items of information 112 about the browser itself, such as a type (SAFARI, EXPLORER, FIREFOX, CHROME, etc.) as well as a version of the browser. The browser information 112 may include information about the device 104a, 104b on which it is executing such as operating system (WINDOWS, MACOS, IOS, LINUX, etc.), operating system version, processor type, screen size, peripheral devices (e.g., additional screens, audio device, camera), etc. Browser information may include a current time, time zone, font information, storage accessibility (size of local storage 116 described below), location information (e.g., longitude and latitude, city, address, etc.), accessibility information, and the like. This information is used according to the methods disclosed below and may be included in browser requests. Other information (e.g., fonts) may be obtained using executable code executing on one or both of the server system 102 or embedded in website data 110.

The browser 108 may execute one or more browser plugins 114 that extend or enhance the functionality of the browser, such as ADOBE ACROBAT READER, ADOBE FLASH PLAYER, JAVA VIRTUAL MACHINE, MICROSOFT SILVERLIGHT, and the like. In some embodiments, the browser information 112 and listing of plugins 114 may be transmitted with requests for web pages or be accessible by scripts executed by the browser, which may then transmit this information to the server system 102 directly or by way of another server system.

The computer 104a, 104b may further include local storage 116 that includes browser-related data such as cookies 118 that are stored by websites visited using the computer 104a, 104b.

The server system 102 may access a database 120 storing user profiles 122a. The user profiles contain data describing a particular user. For example, a user profile 122*a* may contain data describing browsing activity, search activity, purchasing activity, and other tracked behavior of a particular user. The user profile 122*a* may further include data describing demographic attributes (age, gender, income, profession, geographic location, etc.) as well as other attributes such as interests, hobbies, color preferences, etc. The user profile 122*a* may include data from requests received from the user that can be used to characterize the browser 108 or computing device 104*a*, 104*b* or other context of a request (e.g., time zone, language). In particular, the user profile 122*a* may have include any of the data included in a UID (user identifier) record BUID (browser user identifier) record as described in U.S. application Ser. No. 15/788,466 filed Oct. 19, 2017, and entitled BROWSER FINGERPRINTING, which is hereby incorporated herein in its entirety. The server system 102 may likewise implement the methods of U.S. application Ser. No. 15/788,466 in order to populate the user profiles 122*a*.

The database 120 may further include a product database 122*b* containing records describing products that may be returned as search results or as recommended products while browsing a webpage. The methods disclosed herein are described in the context of providing product recommendations. However, any record may be contained in the database 122*b* and selected as a result for display to a user in response to a search term or navigating to a particular web page.

The databases 120 may also store a selection model 122*c*. The selection model 122*c* may take as inputs a user profile 122*a*, context parameters of a browser request (e.g., search terms; data describing a browser; data describing a source device 104*a*, 104*b* of the browser request; and other context information obtained from the browser request such as location, time zone, language, or the like). The selection model 122*c* may process these inputs with respect to the product database 122*b* in order to generate a selection of products to provide in response to the browser request. The selection model 122*c* may include one or both of a set of rules applied to the inputs and an artificial intelligence model trained to generate a selection of products based on a given set of inputs. For example, the selection model The AI model 116 may be a machine learning model such as a neural network, deep neural network (DNN), Bayesian machine learning model, or the like.

The server system 102 may be a back end server system that operates in cooperation with a front end server system 124. The front end server system 130 may operate as a web server that returns webpages from a website 126 in response to browser requests. The front end server system 124 may further generate requests for product selections to the back end server system 102 in response to such requests. The front end server system 124 may then incorporate these product selections (e.g. images of products, links to products, etc.) into webpages returned to user devices 104*a*, 104*b*. In other instances, code embedded in webpages provided by the front end server 124 (e.g., JavaScript code) executes on the user devices 104*a*, 104*b* and requests and receives the product selections from the server system 102 directly or by way of the front end server 124.

The server system 102 may implement a back end module 128 that cooperates with the front end server system 124 and/or code executing on the user devices 104*a*, 104*b* to receive context parameters of a browser request and provide a selection of products in response according to the selection model 122*c*. The context parameters for a request may be any data included in a browser request or in the profile 122*a* of a user that can be associated with the browser request. Accordingly, context parameters may include any of the values used to populate a UID record or BUID record according to U.S. application Ser. No. 15/788,466.

The back end module 128 may further execute a preview module 132 enabling a user to modify the selection model 122*c*, preview changes, and implement further changes prior to deployment. The preview module 132 may implement the methods described hereinbelow.

Figure 2:
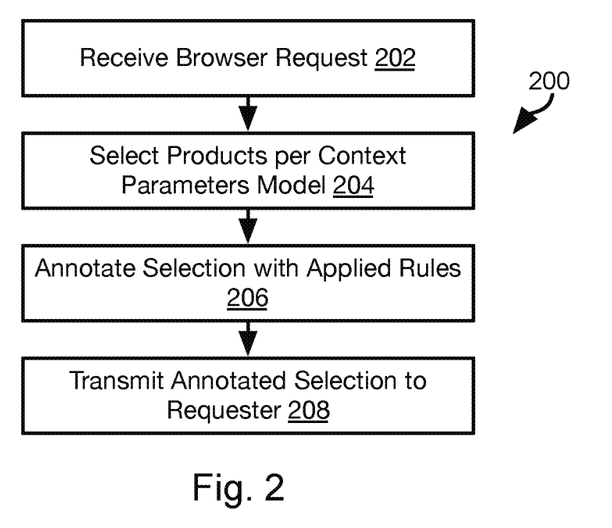
FIG. 2 is a process flow diagram of a method for annotating results of a selection model in accordance with an embodiment of the present invention.

Referring to FIG. 2, the server system 102 may implement the illustrated method 200. The method 200 may include receiving 202 a browser request and selecting 204 products according to the context parameters of the browser request. The method 200 may further include annotating the selection of products with rules used of the selection model 122*c* that resulted in the selection of the products. For example, a rule may specify a list of co-occurring values for multiple context parameters, a list of values for one or more context parameters that are absent, or any other logic that is applied to the context parameters. The rule may further specify that where the list of co-occurring values or non-co-occurring values, and other logic are satisfied that a particular product or product selection logic should be executed to select a product. Accordingly, where a product is selected according to this rule, a reference to that product in the selection may be annotated to refer to this rule.

The product selection as annotated according to step 206 may then be transmitted to a user device 104*a*, 04*b* that generated the browser request, such as by way of the front end server 126. The user device 104*a* may then render the product selection, such as by displaying images of the selected products, a textual listing of each product in the selection, or the like. The user may then select a rendering for a particular product in the selection. In response to this selection, code executing on the user device 104*a* may display a rendering of the rule that annotates that particular product. This enables a user to assess and visualize the functioning of the selection model 122*c*.

Figure 3:
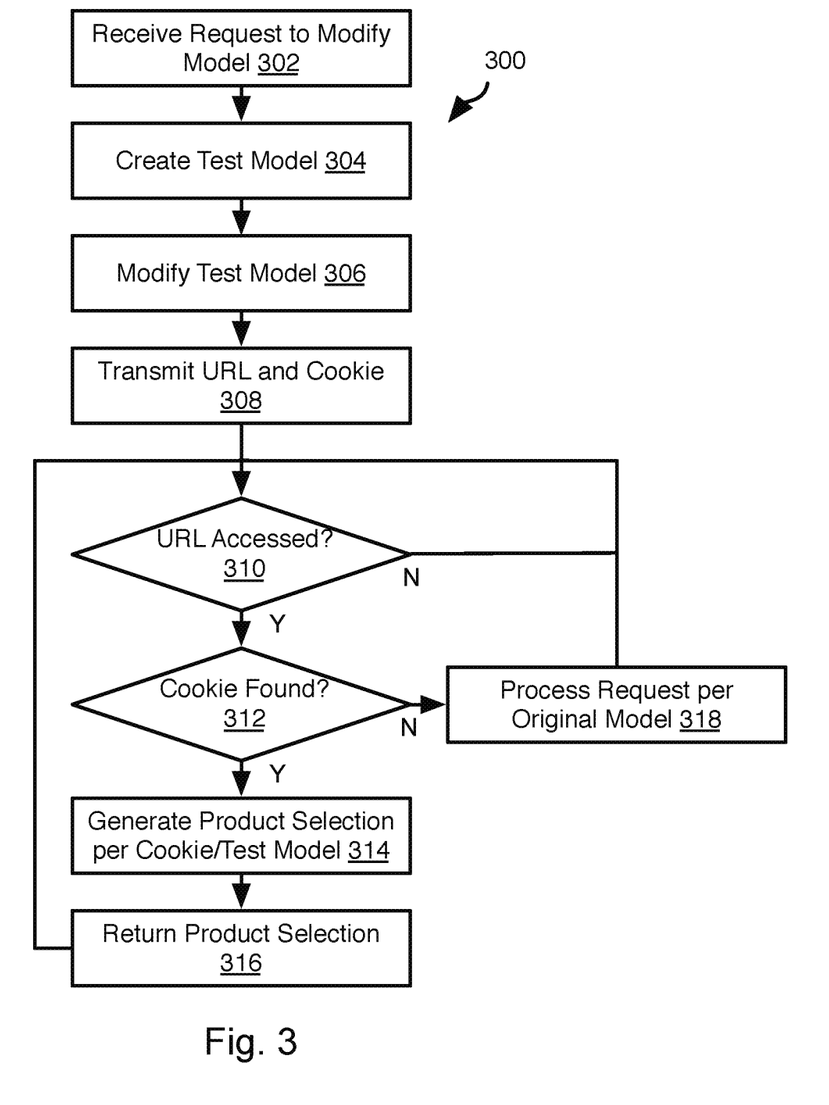
FIG. 3 is a process flow diagram of a method for creating and accessing a test model in accordance with an embodiment of the present invention.

Referring to FIG. 3, the illustrated method 300 may be executed by the server system 102 in order to test and visualize modifications to the selection model 122*c*. The method 300 may include receiving a request to modify the selection model 122*c* from a user device (device 104*a* for illustration purposes).

In response, the server system 102 may then create a test model that is a copy of the selection model 122*c*. The server system 102 may further generate and transmit 308 to the user device 104*a* a URL (uniform resource locator) that references the test model. The server system 102 may also generate and transmit 308 a cookie to the user device 104*a*. The server system 102 may associate the cookie with a set of context parameters. For example, a user may wish to test the response of the test model to a particular set of context parameters and communicate these set of context parameters to the server system 102. The server system 102 may therefore create a cookie storing this set of context parameters or map the cookie to this set of context parameters. The cookie may then be transmitted 308 to the user device. In some instances, the server system 102 may automatically create the set of context parameters, such as using a predefined set of context parameters.

The user may then access the URL, such as by submitting a browser request including the URL and the cookie (or an identifier of the cookie) from the user device 104*a* or a different user device. The front end server 126 may receive the request and forward a request for product selection including the cookie to the back end server system 102.

In response to determining 310 that the URL from step 308 was accessed and determining 312 that the request includes the cookie from step 308, the server system 102 generates a product selection according to the set of context parameters of the cookie using the test model and In response to determining 310 that the URL was accessed and determining 312 that the request included 312 the cookie, the server system 102 generates 314 a product selection using the set of context parameters and the test model according to the approach described above and returns 316 the product selection to the user device that generated the request, such as by way of the front end server 126. This may include generated an annotated product selection using the method 200 of FIG. 2.

Note that the set of context parameters of the cookie are used which may be different from the parameters describing the browser, user device 104a, or user that generated the request evaluated at steps 310 and 312.

In instances where the URL is accessed but is not accompanied by the cookie, the method 300 may include ignoring the request or processing 318 the request using the selection model 122c rather than the test model.

Figure 4:
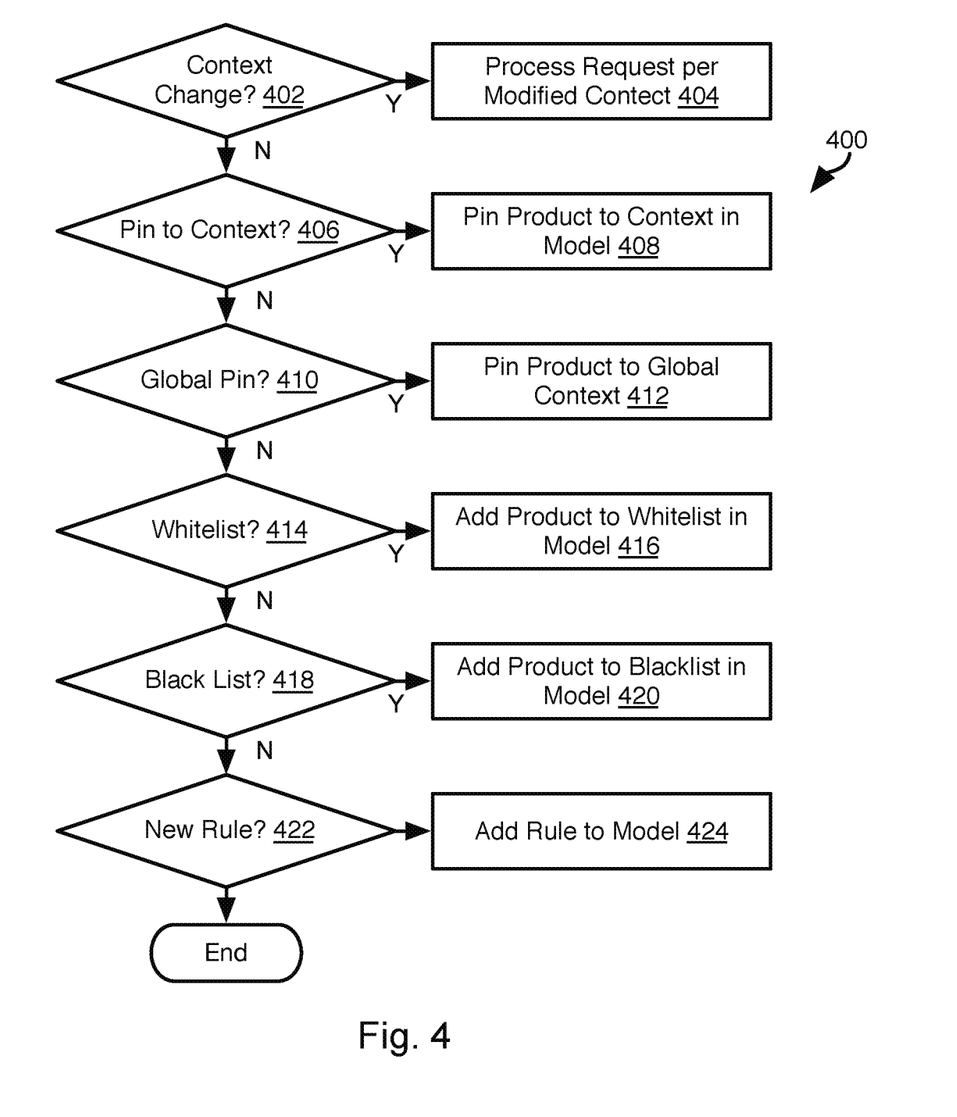
FIG. 4 is a process flow diagram of a method for modifying a selection model in accordance with an embodiment of the present invention.

Referring to FIG. 4, the illustrated method 400 may be executed by the server system 400 in response to inputs from a user on a user device 104a, 104b. In particular, the method 400 provides an approach for modifying the test model thereby enabling a merchant to customize the generation of product recommendations. The method 400 may be used in conjunction with the presentation of a product recommendations using a test model and a set of context parameters as described above with respect to the method 300 of FIG. 3.

The method 400 may include evaluating 402 whether an instruction has been received to change the set of context parameters used to generate product recommendations according to the test model. For example, an interface in a website or client application may be provided by one of the server systems 102, 126 to the user device 104a. This interface may provide controls enabling the user to instruct the server system 102 to change the set of context parameters, such as in the form of Tillable fields, dropdown lists, selectable buttons, uploading a file, or other input approach.

Accordingly, where the user specifies a change to the context parameters, the server system 102 may then process 404 the modified set context parameters using the test model to generate a product selection, which is then transmitted to the user device 104a, such as according to the approaches described above. In some embodiments, the interface on the user device 104a may modify the cookie from step 308 that stores the set of context parameters. Code executing on the user device 104a may then transmit the cookie to the back end server 102, such as by way of the front end server 126. The back end server 126 may then generate a selection of products according to the modified set of context parameters and the test model and transmits the selection to the user device 104a in the same manner as described in the other examples above. Any of the context parameters described may be modified at step 402, such as those that define the browser request or that could be included in the profile data 122a of a visitor. As described below, behavior of the test model may be varied over time and certain behaviors may be scheduled for certain periods. Accordingly, modifying 402 the context may include modifying the date of access to a user defined date that is different from the current data in order to view the behavior of the test model on that user defined date.

The method 400 may include evaluating 406 whether the user has provided an instruction through the interface on the user device 104a to pin a product from a selection to one or more parameters of the current set of context parameters or some other context parameter. In particular, the user may instruct that a particular product or category of products be pinned to one or more value for a context parameter or a set of values for a combination of multiple context parameters. This instruction may be time limited, i.e. specify a date range in which the pinning will be performed. The server system 102 may execute the instruction to pin a product or category to values for one or more context parameters by modifying the test model such that the test model will include that product or a product belonging to that category in the selection of products generated for a browser request including the specified values for one or more context parameters in its set of context parameters.

The method 400 may include evaluating 410 whether an instruction was received from the interface on the user device 104a to implement a global pin. The global pin instruction may specify that a product or product belonging to a particular category be returned each time a product selection is generated regardless of context. The instruction may specify a time period during which this pinning is to be performed. In this manner a user may promote a particular product for a specified time period. In response to the instruction, the server system 102 modifies 412 the test model to include the global pin such that subsequent product selections will have the product or category of product specified by the instruction during a specified time period or until otherwise instructed when no time period is specified.

The method 400 may include evaluating 412 whether an instruction was received from the interface on the user device 104a to add a product or category of products to a whitelist. In response to such an instruction, the server system 102a may add 416 the product or category of products specified in the instruction to a whitelist associated with the test model. Products specified in the whitelist may be selected each time a product selection is generated or may be promoted within internal logic of the test model such that they are selected more frequently than non-whitelisted products.

The method 400 may include evaluating 418 whether an instruction was received from the interface on the user device 104a to add a product or category of products to a blacklist. In response to such an instruction, the server system 102a may add 420 the product or category of products specified in the instruction to a blacklist associated with the test model. Products specified in the blacklist will not be included in subsequent product selections according to the test model.

The method 400 may include evaluating 422 whether an instruction was received to add a new rule to the test model. In response to such an instruction, the server system 102a may add 424 the new rule to the test model. When the test model is thereafter used to generate product selections the new rule will be considered and one or more products may be selected for a product selection when the new rule applies. The new rule may be simple or complex and may take as inputs any number of context parameters of a browser request as specified herein. When a condition of a rule is met, a selection of a product may be made that is likewise a function of any number of context parameters of a browser request. As for other instructions, the new rule may be time limited such that it is only included in the test model for a specified time period before and after which the new rule will not be considered.

Adding of new rules may be performed according to some or all of the following functionality:

Global Rules: These are rules that enable a merchandiser to orchestrate the visitor experience for seasonality changes, product arrivals, short term sales events throughout a site. The merchant may specify a single global merchandising rule to have all product recommendations change according to a time specified by the rule and to include content specified by the rule.

Split Testing: A merchant may specify an AB test wherein first customers are provided a first set of recommendations or recommendations selected according to a first set of rules and second customers are provided a second set of recommendations or recommendations selected according to a second set of rules. The first and second customers may be selected randomly or the rule may specify selection of customers for each group according to attributes or parameters from the user history data 122a of the customers.

Scheduling: A rule may specify a start date and an end date between which a specific set of products is to be presented to customers or during which a specific set of rules are to be used to select product recommendations for customers.

Visual Rules Editor: Rules may be specified using a visual rules editor that presents products and categories of products. The visual rules editor may further provide a graphical user interface to select a product or category of products and to specify a rule to apply to the selected product. For example, rules may be applied to first-time visitors to a site in order to tune the initial experience of these visitors.

Dynamic Pages: Dynamic pages enable merchandisers and marketers to automate the building, updating, merchandising and personalizing of their Category Pages from their catalog, or a promotional landing pages ("Virtual Categories"). In particular, a product catalog may be ingested and category pages generated for products belonging to a particular category.

As is apparent the method 400 provides means for a user to readily control the test model and customize the generation of product selections for particular products, categories of products, and based on values for any number of context parameters for a browser request.

Steps 402-422 may be performed any number of times to use and modify the test model. When a user is satisfied with the state of the test model, the user may instruct the server system 102 to replace the selection model 122c with the test model. The new selection model 122c may then be used to generate product selections according to the methods disclosed herein.

The methods described herein enable a merchant to create merchandising rules and use them across multiple customer touchpoints (website, search results, shopping, email marketing, etc.). This not only reduces the workload of having to create the same rule multiple times but also ensures your rules are completely synchronized when they need to be.

Using the merchandising controls of FIG. 4, a user can orchestrate the customer experience down to the level of a particular product or any category of products at any level of specificity. A user can pin, promote, bury, blacklist, or whitelist a specific product in the interface. For example, a user may drag-and-drop an image of a product into a query based rules editor and provide an instruction with respect to the product according to any of steps 406-422. New rules may be specified based on product categories, sub-categories, attributes of products, and a target contextual audiences based on device, geography, or a buying behavior model. All rules can be scheduled, as well, with start and end dates for promotional and campaign planning.

Figure 5:
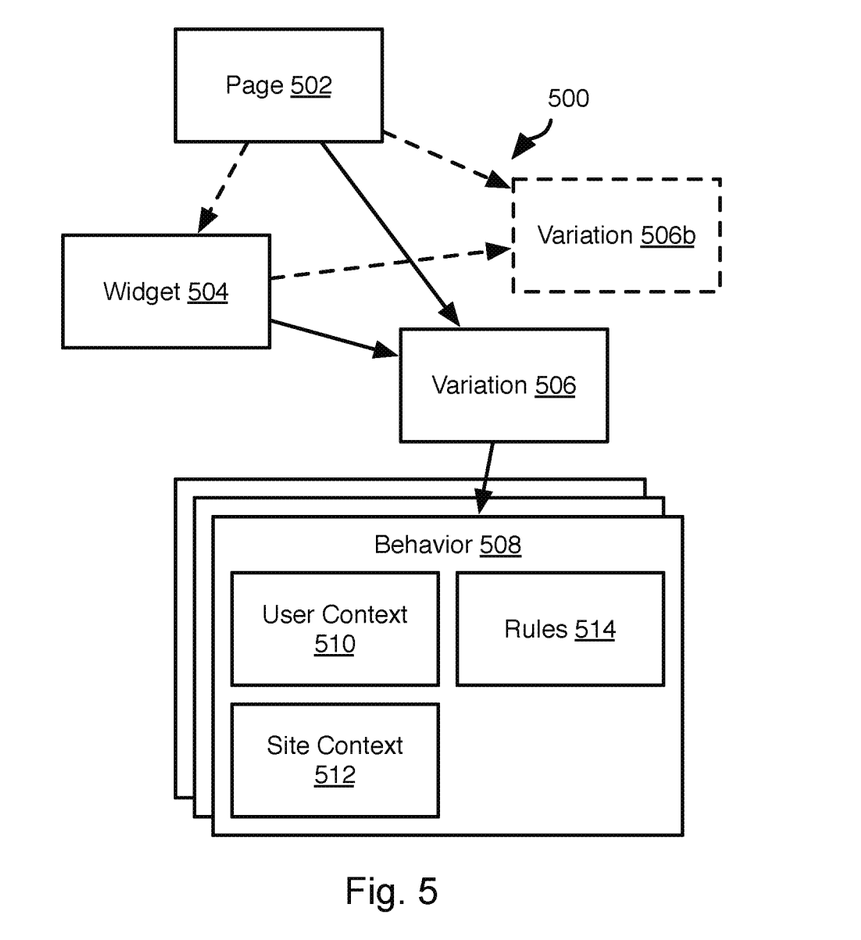
FIG. 5 is diagram illustrating the definition of rules for the selection model in accordance with an embodiment of the present invention.

FIG. 5 illustrates a hierarchy 500 of data structures that may be used to modify the selection model, such as the test selection model. The hierarchy 500 may be used to define modifications according to any of steps 402-422.

In particular, a user may define pages 502 and widgets 504. A page 502 may be a webpage, such as a webpage for a specific product, a specific category of products, a home page of a merchant, or any other webpage providing other information to visitors. A page may be encoded to provide product recommendations and may be generic to multiple products or categories, i.e. a page 502 may be populated with content for a particular product or category of products in response to user request for information about that product or category of products. The product or category of products used to populate the page 502 becomes part of the page's site context as described below.

A widget 504 is a container or data structure that may be embedded in another webpage. The widget 504 could be embodied as executable code, e.g. applet, JavaScript code, or other executable code that can be embedded in code defining a webpage such that a browser will retrieve and execute the widget when the webpage is retrieved by the browser. A widget may also be embedded in an email, search results, or any other document that is rendered on a user device 104a, 104b.

In some embodiments, pages 502 are defined by embedding widgets 504 in them such that widgets 504 are the only structure that are used according to the methods disclosed herein. In the following description, the role of widgets 504 to implement recommendations according to the selection model is described. It shall be understood that a page 502 would function in an identical manner.

A widget 504 may include data defining a variation 506. A variation is a set of behaviors 508 that a user wishes to associated with a particular widget 504. Each behavior 508 defines one or both of a user context 510 and a site context 512 to which the behavior 506 applies. The behavior 506 further includes one or more rules 514 that are used to select product recommendations for display by the widget 504 when all of the specified contexts 510, 512 are present. A user may define any number of behaviors 508 in order to customize the visitor experience for many different combinations of user contexts 510 and site contexts 512.

For example, the user context 510 may include a set of attributes of a visitor as determined from forms filled by the user, a user profile data 122a of the visitor, or any other source of data describing a visitor. Any value for any parameter in the user profile data 122a may be used to define the user context. For example, the user context may be: "males between 18 and 24 that live in the Los Angeles metro area" or "females between 25 and 35 with children that live on the east coast." Other examples of user context 510 values may include a type of device used by a visitor to access the webpage including the widget 504, the referring URL, whether the user is a new or returning visitor, the visitor's country, state, region, zip code, or other descriptor of the visitor's geographic location.

The site context 512 may include a keyword, image identifier, product identifier, product category, referring webpage, search string, query string from a referring page, or other data or metadata included in or referenced by the code (e.g., HTML, code) defining a webpage in which the widget 504 is embedded. In this manner, a single widget 504 may be embedded in multiple webpages and change its behavior based on the webpage in which it is embedded.

Where a page 502 is used, the content used to populate that page is used to determine if the content matches the site context 512 of a behavior 508.

The rule 514 may be any of the rules described above with respect to FIG. 4. For example, a pin-to-context instruction 406 may result in a behavior 508 that includes that context as the user context 510 and the rule 514 may specify that the product pinned should be provided in the recommendations where that user context 510 is present. In a like manner, the rule 514 of a behavior may specify the global pinning (step 410), whitelisting (step 414), blacklisting (step 418), or other rule (step 422) of a product or category of products regardless of context or for a particular user context 510 and/or site context 512.

A rule 514 may specify the boosting or burying of a particular product or category of products. Boosting or burying of a product means that the likelihood of presentation of that product or a product belonging to that category is reduced. For example, where the selection model provides a confidence value for a product recommendation, a buried product would only be presented if the confidence value is at a higher threshold than would otherwise be required if the product had not been buried. A boosted product would be presented when the confidence value is above a lower threshold but below a threshold confidence that would otherwise be required if the product had not been boosted.

In some embodiments, widgets 504 may have inheritance. For example, one or more global behaviors 508 may be defined with corresponding contexts 510 and/or 512 and rules 514. Each widget 504 will therefore include these global behaviors 508 without requiring a user to manually specify them. In this manner, a particular product or policy may be implemented across an entire website and for all merchant advertising without requiring modification of each widget 504. In some embodiments, global behaviors 508 may be overridden by behaviors 508 for a particular widget 504. For example, where a behavior 508 of a widget 504 specifies a rule 514 for a particular set of contexts 510, 512 and a global behavior 508 specifies a different rule for that same set of contexts 510, 512, the behavior 508 of the widget may preempt the global behavior.

In some embodiments, behaviors 508 may be accumulated. In particular, hierarchy may be defined and the widget 504 may be assigned to a node in the hierarchy with one or more ancestor nodes in the hierarchy, each ancestor node having one or more behaviors 508 associated therewith. Accordingly, the widget 504 would accumulate the behaviors 508 of all of its ancestor nodes in the hierarchy in addition to behaviors 508 included expressly in that widget 504.

Note that where A/B testing is desired, a merchant may associate one or more other variations 506b with a widget 504. Accordingly, either randomly or based on segmentation based on user profile data 122a, a variation 506 or 506b may be selected for selecting product recommendations for rendering in a widget 504 in order to implement the A/B test.

Note that pages 502, widgets 504, behaviors 508, user contexts 510, site contexts, and rules 514 may be defined using a graphical user interface (GUI) with drag-and-drop functionality. For example, a product may be dragged and dropped onto a graphical representation of a widget 504 in order to define the site context for that widget. Likewise, user context values may be added using text input fields or by dragging and dropping elements from a palette of user context values.

Figure 6:
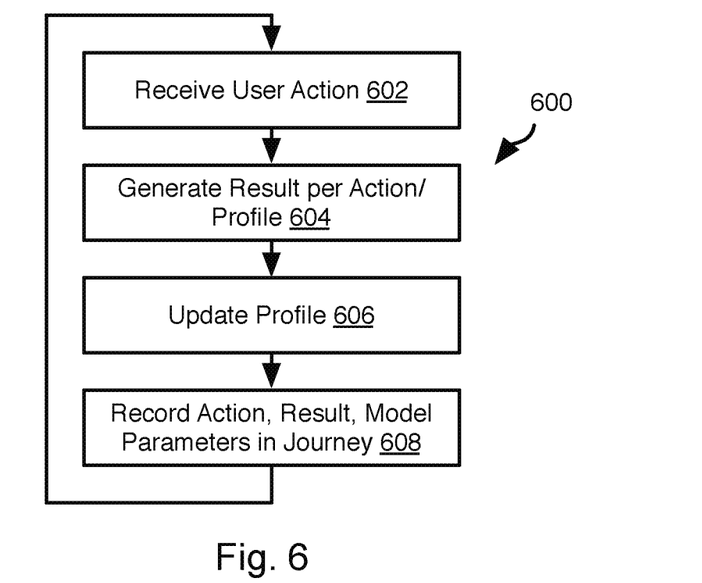
FIG. 6 is a process flow diagram of a method for tracking a user journey in accordance with an embodiment of the present invention.

Referring to FIG. 6, in some embodiments, a customer's "journey" may be captured, where the journey is a record of actions taken by the customer, content accessed by the customer, product recommendations provided to the customer, products purchased by the customer.

For example, the illustrated method 600 may be executed by the server system 102, the server system 124, or a combination of the two. The method 600 may include receiving 602 a user action. Some non-limiting examples of user action may include:

Receiving a webpage request from a referring site (e.g., FACEBOOK, GOOGLE, a partner site).
Receiving a webpage request from the customer clicking on an advertisement;
Receiving input of a search term in a search field
Receiving a customer's selection of a search result
The customer scrolling through search results
The customer selecting a recommended product
The customer adding a product to an electronic shopping cart
The customer purchasing a product.

The method 600 may further include generating 604 a result according to the action and the customer's profile. In particular, where a webpage is requested, that webpage may be returned along with a set of product recommendations that are generated based on the profile of the requesting customer (if available) and the identity of the requested webpage. In particular, if the user selects and advertisement for a specific product, the recommended products may be of the same category as the specific product, for use with the specific product, purchased along with the specific product by other users, purchased after viewing the specific product, or having some other relationship to the specific product. The recommended products may further be filtered or selected based on interests and demographics of the customer as recorded in the customer's user profile data 122a, provided the customer has a profile and the action can be associated with the customer.

The manner in which recommendations are generated for a customer action maybe according to any approach known in the art. For example, product recommendations may be made using a selection model as defined and modified using the approach described above and as discussed in U.S. application Ser. No. 15/788,466.

The method 600 may further include updating 606 the user profile data 122a of the customer. In particular, the user action may communicate something about the interests of the user, such as the identity of a product in an advertisement selected or for which the webpage was requested. Accordingly, the user profile data 122a may be updated to indicate an interest in that product. Where the action is entry of search terms requested by the user (e.g., product, product category, colors, activities, genres, or other information communicated by the search terms) these search terms may be used to update the profile of the customer to indicate interest in the concepts represented by the search terms.

The method 600 may further include recording 608 a record corresponding to the user action. The record may include a representation of the user action, i.e. parameters describing the user actions listed above, i.e. the referring webpage, the advertisement clicked, the search terms provided, scrolling action performed, recommendations clicked on, products added to a cart or purchased, or any other data representing the product or webpage interacted with by the customer or information provided by the customer as part of the action.

The record of an action may further include identifiers of recommended products as a result of the action. The record may further include one or more parameters of a model used to select the recommended products. For example, many artificial intelligence models will output a confidence level with an output of the model. The confidence level is an estimate of the accuracy of the output. In this case, the confidence level of a recommended product as a result of the action may be stored in the record. The confidence level may represent a likelihood the customer will select the product and therefore indicates an affinity of the customer to the recommended product according to the model. The confidence level may also be viewed as a probability of selection or a predicted click-through rate for the recommended product. Other parameters of the model may include rules applied to select the product (see discussion of FIG. 2, above).

The records of each action may be stored, such as part of the user profile data 122a of the customer. Accordingly, the records in order of creation represent the journey of the customer.

Figure 7:
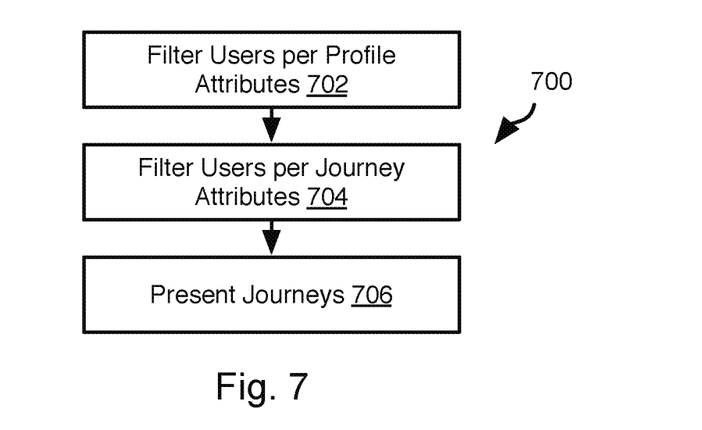
FIG. 7 is a process flow diagram of a method for presenting user journeys in accordance with an embodiment of the present invention.

Referring to FIG. 7, the journeys of a customer or of a group of customers may be presented to a user. For example, a user may specify filtering 702 according to profile attributes, such as customer's belonging to a specific demographic (e.g., Male, 18-24, living in Los Angeles metro area).

A user may specify filtering 704 according to journey attributes. For example, user's may be filtered based on how a journey started, e.g. those customers who begin interacting with a merchant due to a referral from FACEBOOK, those customers who clicked on the same advertisement content, or other type of referral. Filtering may be based on purchases, e.g., those journeys that included the customer purchasing something, those journeys that included purchase of a specific product or class of products. Filtering may be based on intermediate actions within the journey, e.g., those journeys that included a customer action with respect to a first product (clicking on advertisement for the first product, searching for the first product, selecting a recommendation for the first product) but were followed by customer purchase of a second product different from the first product. Journeys may be filtered based on length, e.g. length of time or number of customer actions, between starting of the journey and purchasing of a product.

Those journeys that satisfy the filter criteria of steps 702 and 704 may then be presented 706 to the user. Where multiple journeys satisfy the filter criteria, the user may be presented with a listing of the journeys, which the user may then select to view details of a specific journey. A specific journey may be displayed in the manner shown in FIG. 8. Listings may also be displayed simultaneously, e.g. side-by-side or as a matrix.

Other operations may be performed with respect to a set of journeys, such as a set of journeys meeting a filter criteria. For example, pattern analysis of the user actions and the data recorded for each user action may be used to determine a most common path to purchasing of a product.

Figure 8:
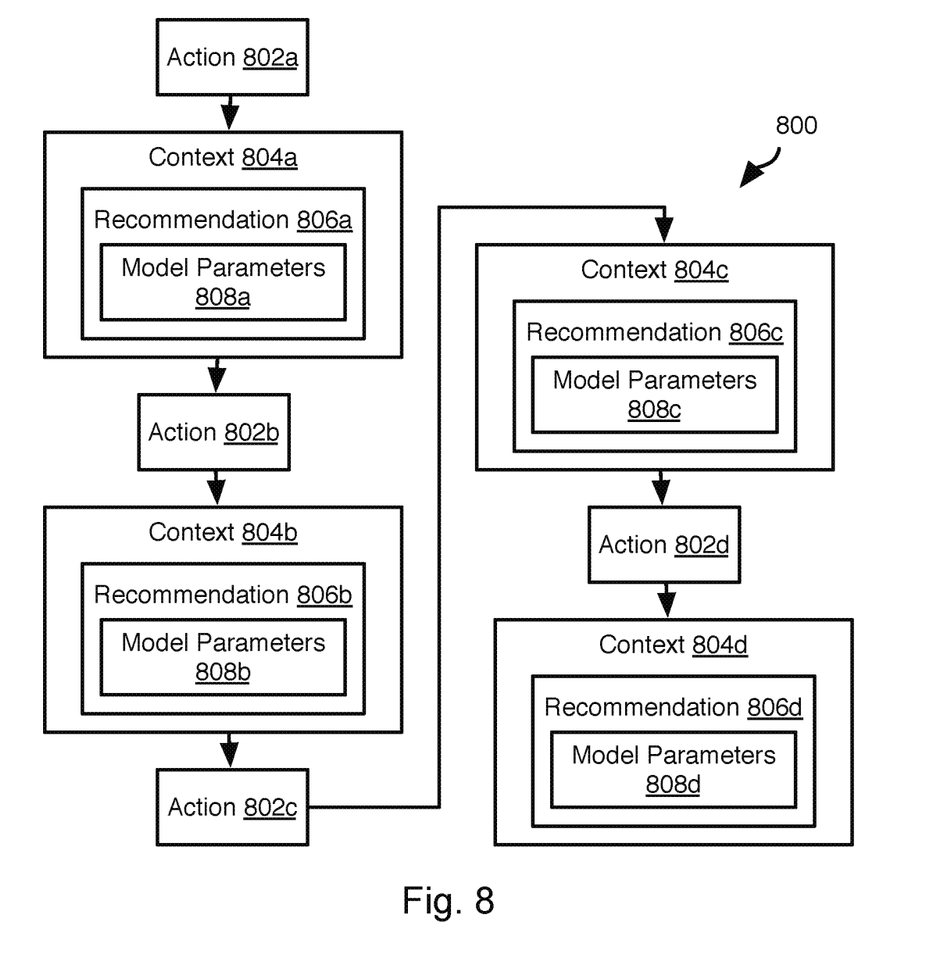
FIG. 8 is a schematic diagram illustrating a user journey in accordance with an embodiment of the present invention.

Referring to FIG. 8, a journey may be represented in various stages, each stage corresponding to a particular customer action 802a-802d. The stage for a customer action 802a-802d may include context data 804a-804d provided to the customer in response to the customer action 802a-802d, product recommendations 806a-806d provided to the customer along with the context data 804a-804d, and model parameters 808a-808d relating to the selection of the product recommendations 806a. Journeys may be displayed in real time, e.g. as the user is taking actions, these actions and corresponding context, recommendations, and model parameters may also be displayed. For example, a filter criteria may be all journeys where the user is current performing user actions (e.g., has performed an action within the last N seconds or minutes, where N is a predetermined time window preceding the current time).

The representation of the user action 806a-806d for a stage may include a graphical representation of a link, advertisement, or other visual element selected by the user as part of the user action. Where the user action is entry of search terms, these search terms may be displayed as the user action 806a-806d. The context data 804a-804d may be a webpage, list of search results, or other data provided to the user as a result of the user action, i.e. the data requested by the customer.

The representation of a stage may also include the product recommendations 806a-806d selected for the user as a result of the action and the model parameters 808a used to select the products for the product recommendations. The model parameters 808a-808d may include some or all of the model parameters noted above as being stored in the record for a user action (see description of step 608).

The stages of the journey may be displayed simultaneously or may be scrolled through individually or displayed simultaneously. For example, each stage may be represented by an entry in a list presented to the user. In response to selection of or scrolling to an entry, the data for that stage may then be displayed as shown in FIG. 8.

FIG. 8 further illustrates how a journey may be defined. Other than the first customer action 802a, each subsequent action 802b-802d added to a journey may be constrained to be at least one of (a) a result of a user action with respect to the context 804a-804c of a preceding customer action 802a-802d in the journey, (b) a result of a user action with respect to a product recommendation 806a-806c of a preceding customer action 802a-802c, (c) purchase of a product added to an electronic shopping cart during at least one of (a) and (b) for another customer action 802a-802c in the journey. Accordingly, a new journey may begin with entry into the website from a referrer or other access of a webpage the website that is not the result of interaction with another webpage of the website, such as an interaction according to (a), (b), or (c) in some embodiments.

Figure 9:
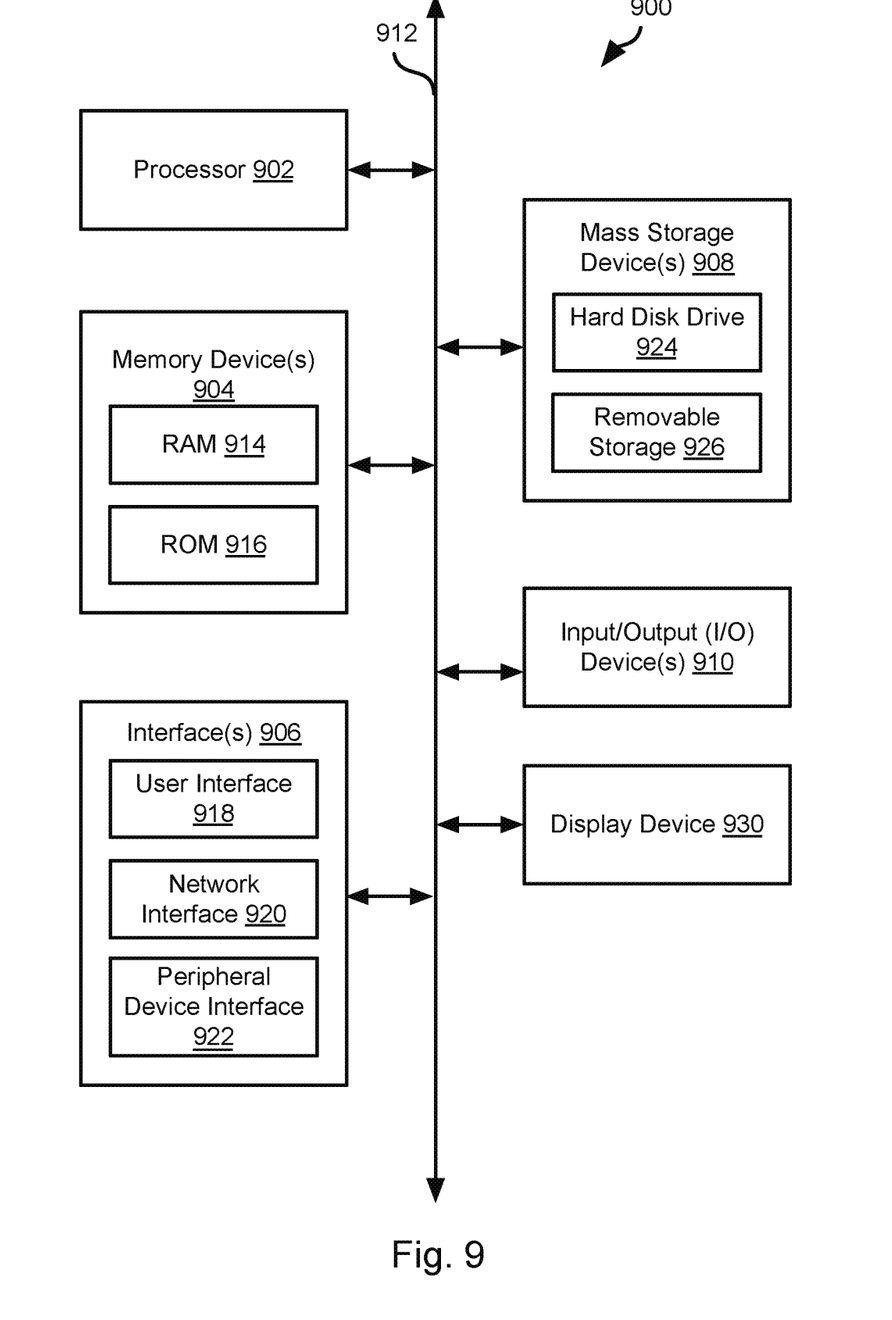
FIG. 9 is a schematic block diagram of a computer system suitable for implementing methods in accordance with embodiments of the present invention.

FIG. 9 is a block diagram illustrating an example computing device 900 which can be used to implement the system and methods disclosed herein. The server system 102, computing devices 104a, 104b, and front end server 124 may also have some or all of the attributes of the computing device 900. In some embodiments, a cluster of computing devices interconnected by a network may be used to implement any one or more components of the invention.

Computing device 900 may be used to perform various procedures, such as those discussed herein. Computing device 900 can function as a server, a client, or any other computing entity. Computing device can perform various monitoring functions as discussed herein, and can execute one or more application programs, such as the application programs described herein. Computing device 900 can be any of a wide variety of computing devices, such as a desktop computer, a notebook computer, a server computer, a handheld computer, tablet computer and the like.

Computing device 900 includes one or more processor(s) 902, one or more memory device(s) 904, one or more interface(s) 906, one or more mass storage device(s) 908, one or more Input/output (I/O) device(s) 910, and a display device 930 all of which are coupled to a bus 912. Processor(s) 902 include one or more processors or controllers that execute instructions stored in memory device(s) 904 and/or mass storage device(s) 908. Processor(s) 902 may also include various types of computer-readable media, such as cache memory.

Memory device(s) 904 include various computer-readable media, such as volatile memory (e.g., random access memory (RAM) 914) and/or nonvolatile memory (e.g., read-only memory (ROM) 916). Memory device(s) 904 may also include rewritable ROM, such as Flash memory.

Mass storage device(s) 908 include various computer readable media, such as magnetic tapes, magnetic disks, optical disks, solid-state memory (e.g., Flash memory), and so forth. As shown in FIG. 9, a particular mass storage device is a hard disk drive 924. Various drives may also be included in mass storage device(s) 908 to enable reading from and/or writing to the various computer readable media. Mass storage device(s) 908 include removable media 926 and/or non-removable media.

I/O device(s) 910 include various devices that allow data and/or other information to be input to or retrieved from computing device 900. Example I/O device(s) 910 include cursor control devices, keyboards, keypads, microphones, monitors or other display devices, speakers, printers, network interface cards, modems, lenses, CCDs or other image capture devices, and the like.

Display device 930 includes any type of device capable of displaying information to one or more users of computing device 900. Examples of display device 930 include a monitor, display terminal, video projection device, and the like.

Interface(s) 906 include various interfaces that allow computing device 900 to interact with other systems, devices, or computing environments. Example interface(s) 906 include any number of different network interfaces 920, such as interfaces to local area networks (LANs), wide area networks (WANs), wireless networks, and the Internet. Other interface(s) include user interface 918 and peripheral device interface 922. The interface(s) 906 may also include one or more user interface elements 918. The interface(s) 906 may also include one or more peripheral interfaces such as interfaces for printers, pointing devices (mice, track pad, etc.), keyboards, and the like.

Bus 912 allows processor(s) 902, memory device(s) 904, interface(s) 906, mass storage device(s) 908, and I/O device (s) 910 to communicate with one another, as well as other devices or components coupled to bus 912. Bus 912 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 900, and are executed by processor(s) 902. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s). At least some embodiments of the disclosure have been directed to computer program products comprising such logic (e.g., in the form of software) stored on any computer useable medium. Such software, when executed in one or more data processing devices, causes a device to operate as described herein.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A system comprising:
a back end server including one or more processing devices and one or more memory devices operably coupled to the one or more processing devices, the one or more memory devices storing executable code effective to cause the one or more processing devices to:
receive a first request from a user device, the first request associated with first context parameters describing the user device and a user of the user device;
process the first request by applying a selection model to the first context parameters to obtain a first response;
transmit the first response to the user device;
receive, from the user device, a specification of second context parameters that do not correspond to the user device and the user of the user device;

associate the second context parameters with an identifier;
transmit the identifier to the user device;
receive a second request from the user device, the second request associated with the first context parameters and including the identifier;
determine that the second request includes the identifier;
in response to determining that the second request includes the identifier, process, the second request by applying the selection model to the second context parameters instead of the first context parameters to obtain a second response; and
return the second response to the user device.

2. The system of claim 1, further comprising a front end server programmed to receive the first request from the user device and forward the first request to the first server.

3. The system of claim 1, wherein the first context parameters include at least one of: attributes of a user, a user browsing history, a user search history, a user purchase history, browser parameters for a browser generating the first request on the user device, and device parameters describing the user device.

4. The system of claim 1, wherein the executable code is further effective to cause the one or more processing devices to:
receive, from the user device, an instruction to pin a selected result of the second response;
in response to the instruction to pin the selected result, modify the selection model to return the selected result in response to all requests.

5. The system of claim 1, wherein the executable code is further effective to cause the one or more processing devices to:
receive, from the user device, an instruction to pin a selected result of the second response to the second context parameters; and
in response to the instruction to pin the selected result, modify the selection model to return the selected result in response to all requests having the second context parameters.

6. The system of claim 1, further comprising:
receive, from the user device, an instruction to black list a selected result of the second response; and
in response to the instruction to blacklist the selected result, modify the selection model to refrain from returning the selected result.

7. The system of claim 1, wherein the selection model is an artificial intelligence model.

8. A method comprising:
receiving, by a first server, a first request from a user device, the first request associated with first context parameters describing the user device and a user of the user device;
processing, by the first server, the first request by applying a selection model to the first context parameters to obtain a first response;
transmitting, by the first server, the first response to the user device;
receiving, by the first server, from the user device, a specification of second context parameters that do not correspond to the user device and the user of the user device;
associating, by the first server, the second context parameters with an identifier;
transmitting, by the first server, the identifier to the user device;
receiving, by the first server, a second request from the user device, the second request associated with the first context parameters and including the identifier;
determining, by the first server, that the second request includes the identifier;
in response to determining that the second request includes the identifier, processing, by the first server, the second request by applying the selection model to the second context parameters instead of the first context parameters to obtain a second response; and
returning, by the first server, the second response to the user device.

9. The method of claim 8, further comprising
receiving, by a front end server, the first request from the user device and forwarding the first request to the first server.

10. The method of claim 8, wherein the first context parameters include at least one of: attributes of a user, a user browsing history, a user search history, a user purchase history, browser parameters for a browser generating the first request on the user device, and device parameters describing the user device.

11. The method of claim 8, further comprising:
receiving, by the first server from the user device, an instruction to pin a selected result of the second response;
in response to the instruction to pin the selected result, modifying, by the first server, the selection model to return the selected result in response to all requests.

12. The method of claim 8, further comprising:
receiving, by the first server from the user device, an instruction to pin a selected result of the second response to the second context parameters;
in response to the instruction to pin the selected result, modifying, by the first server, the selection model to return the selected result in response to all requests having the second context parameters.

13. The method of claim 8, further comprising:
receiving, by the first server from the user device, an instruction to black list a selected result of the second response;
in response to the instruction to blacklist the selected result, modifying, by the first server, the selection model to refrain from returning the selected result.

14. The method of claim 8, wherein the selection model is an artificial intelligence model.

* * * * *